United States Patent
Forman et al.

(10) Patent No.: US 7,200,604 B2
(45) Date of Patent: Apr. 3, 2007

(54) DATA DE-DUPLICATION

(75) Inventors: George Henry Forman, Port Orchard, WA (US); Fereydoon Safai, Los Altos Hills, CA (US); Bin Zhang, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 471 days.

(21) Appl. No.: 10/780,235

(22) Filed: Feb. 17, 2004

(65) Prior Publication Data
US 2005/0182780 A1    Aug. 18, 2005

(51) Int. Cl.
*G06F 17/30* (2006.01)
(52) U.S. Cl. .................... 707/101; 707/200
(58) Field of Classification Search ............. 707/6, 707/100, 101, 200, 202, 206; 705/64, 75, 705/38–39
See application file for complete search history.

(56) References Cited

U.S. PATENT DOCUMENTS

| | | | |
|---|---|---|---|
| 2001/0042785 A1* | 11/2001 | Walker et al. | 235/379 |
| 2002/0023023 A1* | 2/2002 | Borecki et al. | 705/26 |
| 2002/0095303 A1* | 7/2002 | Asayama et al. | 705/1 |
| 2002/0111886 A1* | 8/2002 | Chenevich et al. | 705/30 |
| 2003/0191711 A1* | 10/2003 | Jamison et al. | 705/40 |

* cited by examiner

*Primary Examiner*—Cheryl Lewis

(57) ABSTRACT

Generating masks for de-duplication in a database where distributed entities provide activity data for said database. Determining from activity input data which entities add variable data to a given data field. Generating a list of the masks which effectively remove the variable data portion in the field. Consolidating input data using the generated masks.

21 Claims, 3 Drawing Sheets

DATA DE-DUPLICATION

BACKGROUND

1. Technical Field

The disclosure relates generally to data processing, data mining, and knowledge discovery.

2. Description of Related Art

Along with the revolutionary advancements in commercial and private enterprises brought about by the introduction of the personal computer have come new problems. Particularly, with respect to the Internet, both electronic commercial exchanges, also now known as "E-commerce," and direct business-to-business electronic data processing, have led to decreasing quality control with respect to data records received from other parties. In other words, in traditional systems, only a company's select few employees had authority to enter data directly into an established database in accordance with rules generally designed to optimize data integrity. Now, in order to speed processes, remote access to a database may be granted to a plurality of persons or entities, e.g., clients, customers, vendors, and the like, who may be using a plurality of different software programs or simply may ignore the requirements intended by the associated enterprise receiving data and maintaining the database . As a result, the database may contain duplicative and erroneous data which must be "cleaned." "Data cleaning," or "data clean-up," are the terms of art generally used to refer to the handling of missing data or identifying data integrity violations, where "dirty data" is a term generally applied to input data records, or to particular data fields in the string of data comprising a full data record, which may have anomalies, in that they may not conform to an expected format or standard or content for the established database.

Many companies need to analyze their business transaction records or activity records to either create a database or to match each against an existing database of their customers, clients, employees, or the like. For example, consider a data intensive commercial enterprise such as processing credit card transactions. Each transaction may comprise an electronic digital data packet in which a data string is broken into predetermined fields wherein each field may contain specific information; e.g. each packet might contain: <name, telephone number, postal code, credit card number, transaction amount>. On a worldwide basis, millions of transactions can be logged in a single twenty-four hour period for the card processor to receive, store, and process. Many different types of data errors may be introduced in each transaction. For example, one regular complication arises where the merchant-identifying data field for the transaction record is polluted with information specific to the individual transaction. As examples, consider a data set of transactions where an intended "authorized merchant name" field indicates not only the name, but also additional, variable information added by the merchants:

EBAY #234983498, EBAY #392385753, EBAY # . . .
  where the Internet auction web site commonly referred to as "EBAY" has entered both its name and a specific on-line auction item identification number;
UNITED AIRLINES #387394578, UNITED AIRLINES #948693842, UNITED AIRLINES # . . . , where UNITED has entered both its name and a specific passenger ticket number; and
MACY'S WOMAN'S CLOTHING, MACY'S TOYS, MACY'S . . . , where one or more stores known as MACY'S have entered both its name and a specific sales department of the store and where such departments may vary from store-to-store.

The credit card processor is looking for a distinct "name" and while each "name" field is distinct, there may be three or more authorized merchants, EBAY, UNITED AIRLINES, MACY'S, for the processor to sort out. Consider further the example of the chain stores "WALMART," and for which may appear in the daily log of transactions references such as: WALMART #239823, WALMART #234894, WALMART #459843, and WALMART #958384, where each WALMART enters both its name and a specific store number, e.g., #239823 being in Palo Alto, Calif. , #234894 being in Mt. View, Calif., and both #459843 and #958384 being in Cupertino, adding a potential complication wherein two different store locations may reside in the same city under a same U.S. zip code.

From this example of a credit card processor, it can be recognized that storing each individual activity for enterprises which have a broad installed base from which extensive input data is regularly received without cleaning dirty data and eliminating unnecessary duplication of information may lead to extensive and generally expensive hardware requirements in terms of data storage and data processing resources. Perhaps more importantly, dirty data degrades the quality of data analyses processes. Moreover, while it can be determined that certain dirty data may allow a many-to-one mapping intuitively, it is a slow, manual labor task—e.g., one can study a log of transactions and come to realize that in every transaction for "EBAY . . . ," it is always related to data representative of the city "Palo Alto" and the state "CA" and therefore all transaction records can be assigned to a single file of the database for that store, likely a transaction number given out by the EBAY corporation.

It would be advantageous to build and maintain databases which cleans data and consolidates duplicative data automatically in addition to other advantages.

BRIEF SUMMARY

The exemplary embodiments of the present invention described provide generally for methods and apparatus for data processing, data mining, and knowledge discovery, and more particularly, to generating rules for data de-duplication.

The foregoing summary is not intended to be inclusive of all aspects, objects, advantages and features of the present invention nor should any limitation on the scope of the invention be implied therefrom. This Brief Summary is provided in accordance with the mandate of 37 C.F.R. 1.73 and M.P.E.P. 608.01(d) merely to apprise the public, and more especially those interested in the particular art to which the invention relates, of the nature of the invention in order to be of assistance in aiding ready understanding of the patent in future searches.

Figure 1:
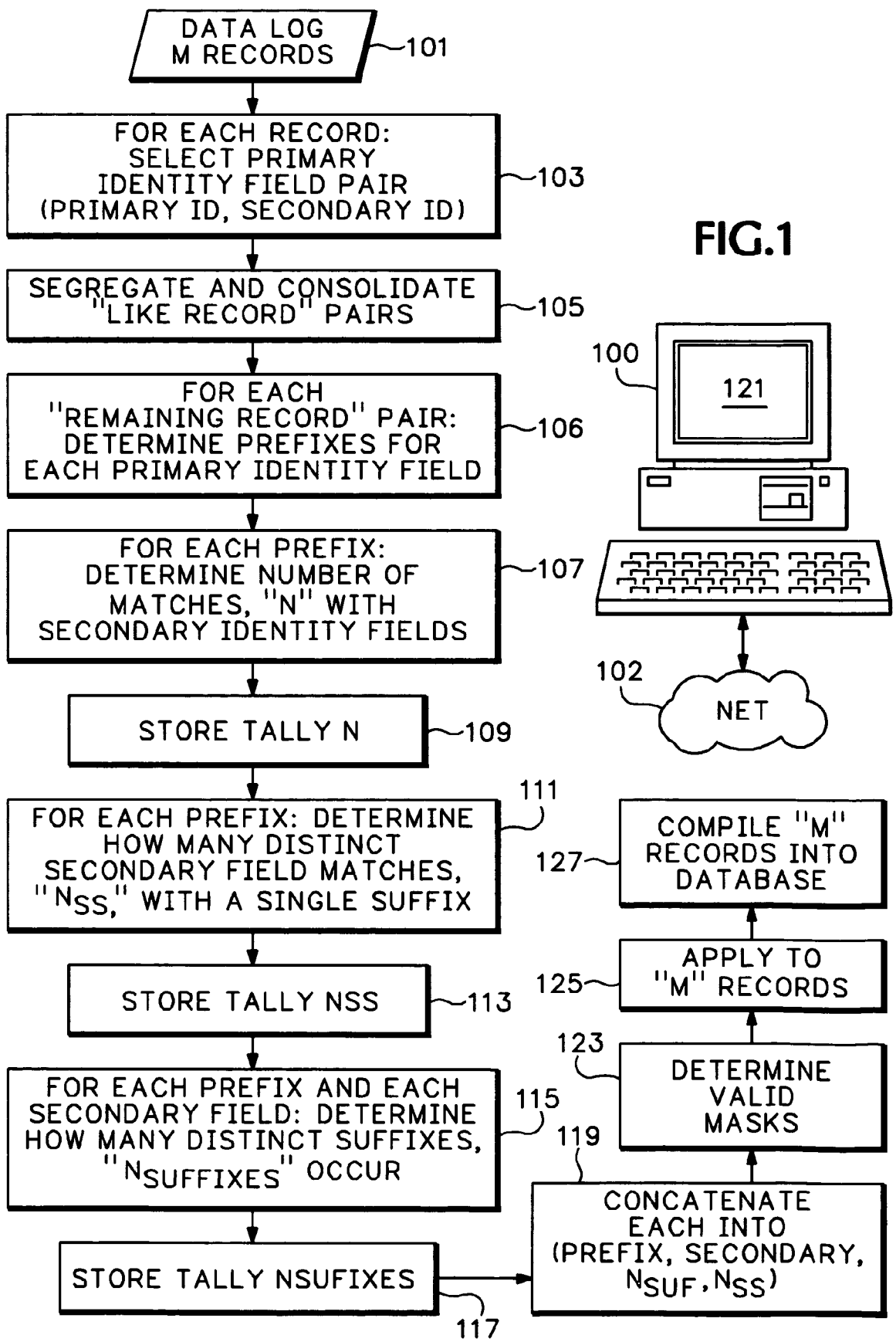
FIG. 1 is an illustration of a computerized system and process of a first exemplary embodiment of the present invention.

Like reference designations represent like features throughout the drawings. The drawings in this specification should be understood as not being drawn to scale unless specifically annotated as such.

DETAILED DESCRIPTION

In order to describe a process for de-duplication of data, an exemplary embodiment related to credit card transaction data processing is discussed in this section. No limitation on the scope of the invention is intended by this use of this exemplary construct, nor should any be inferred therefrom.

Assume that a large collection of credit card transactions—e.g., a daily log from worldwide, authorized merchants to, or otherwise received by, the card processor—includes for each transaction at least data fields intended for "Merchant Name" and "Merchant Postal Code." One goal for the card processor may be to build and maintain a database with each authorized merchant preferably listed only once; for example, one file for "UNITED AIRLINES" which will be a repository of all transactions related to that corporation. Trying to use unique "name, zip code" data pairs alone results in extensive duplication because as described in the Background Section above, as merchants tend to include variable data—"dirty data"—in their name field with each transaction as suits their needs or their software specifications. In other words, there may be many false eponyms for what is likely a single entity's true name; e.g., "United Airlines, Incorporated" may be entered as "United Air," "UAL" or other eponyms, and may include other variable data such as ticket numbers. Thus, one basic aspect of this exemplary embodiment is to determine which entities have used variable data in given data fields and to create, store, and use a list of masks—rules for ignoring dirty data portions of a data field—that in effect will clean-up the contaminated data by removing the variable data segments. The generation of such masks allows the assigning of a specific credit card transaction to a specific authorized merchant most likely to be the merchant for which the transaction took place. More generically this may be stated as matching a specific activity to a specific known entity of a vast plurality of known entities wherein de-duplication of entities is optimized.

It will be recognized by those skilled in the art that masks may be expressed in any programming language used to implement the present invention, e.g., a UNIX sed expression or a PERL expression may form such a programming rule. Further detailed description of such is not essential to an understanding of the description of the present invention.

It will be recognized by those skilled in the art that a program for data de-duplication should also be flexible in that it should not rely on there being a consistent syntax in dirty data. One card processor may get transactions such as "United Airlines #387394578" or United Air #387394579" or "UAL #387394580MATHEWS" or other perturbations and variations in a daily log of input data. Moreover, many names may be duplicated for different places; United Airlines has thousands of computer terminals selling daily reservations and tickets around the world. Yet, it is a single corporation.

Therefore, a program for data de-duplication may need to account for a distributed base of data sources in many places in order to consolidate data. On the contrary, independent franchises may be completely separate business entities, yet have a very similar trade name worldwide, e.g., STARBUCKS COFFEE; a single repository file for such franchises may not be appropriate or efficient. Furthermore, the program should discriminate for conflicts when common identifying characteristics exist; "United" alone may not a good identifier for de-duplication of data where data is being received from "United Airlines," "United Van Lines," and "United Furniture Warehouse."

FIG. 1 is an illustration of a computerized system and process of a first exemplary embodiment of the present invention. The computer 100 and network 102, such as the Internet, represented generically. The process illustrated is applied to a data log 101 of "m" records intended for compilation with a given database. A goal is to generate masks which may be applied to the log in order to minimize duplication of data in the database. Generally, each record is assumed to be a report of an activity in the form of a digital data string, each data string having distinct data fields digitally representing specified data related to each activity to be added to the database. Such data fields typically include at least one data field for identifying which entity related to the database is reporting the activity. A primary entity identifier field and secondary entity identifier field may be selected 103 for each record to create an identity data pair for each record. This data pair may be represented generically as: "(PRIMARY ID, SECONDARY ID)." For purposes of the process, it may assumed that the PRIMARY ID may be dirty data—e.g., an entity common name—and preferably the SECONDARY ID may be presumed to be clean data, that is, a type of data not generally suited to the addition of variable data, e.g., a zip code. It should be recognized by those skilled in the art that the PRIMARY ID data field and SECONDARY ID data field selected for use in data de-duplication will be dependent upon the nature specific database of the specific implementation.

In order to limit the iterations of the process, and computing and data storage resources, a preliminary subprocess 105 is performed to cull those data records having an identifiable unique PRIMARY and SECONDARY ID data. For example, although "WALMART #54, 98045" may be present many times in the input data, this unique pair will be preceded only once by remaining steps. Thus, from the initial log of "in" records, a relatively large number may be stored, "LIKE RECORDS" 105, leaving a limited number of activity records, "REMAINING RECORDS," for further analysis from which masks may be generated.

For each REMAINING RECORD, another subprocess 106 may be applied to determine likely places to separate the full PRIMARY ID field into two parts, a "prefix" and a "suffix." That is, assuming the PRIMARY ID data may include dirty data at the end, there may be a unifying prefix that is unique. Alternatively, one might choose another part of the syntax of the PRIMARY ID field to distinguish, depending upon the nature of the expected input data for the specific implementation. Examples of heuristics which may be applied to separate a full PRIMARY ID field are:

(1) let a suffix consist of a sequence of one or more whitespace characters (e.g., word space or tab), followed by either a "#" symbol or "*" symbol followed by anything up to the end of the data string, (2) let a suffix consist of all characters at the end of the string that are in a given character set (e.g., blank space, "#," "$,", digit from 0–9), (3) let a suffix consist of all characters after three blank spaces, (4) let a suffix consist of all non-alphanumeric characters through the end of the string, or the like.

Next, each uniquely derived PRIMARY ID prefix may be considered individually.

First, the number of distinct SECONDARY ID values associated with the prefix is tallied 107. That tally may be stored 109, "Tally n."

Next, 111, for each unique PRIMARY ID prefix, it is determined for how many distinct SECONDARY ID values the prefix has only a unique suffix. A second tally may be stored 113, "Tally $n_{ss}$."

Next for each uniquely derived PRIMARY ID prefix and each SECONDARY ID, how many distinct suffixes occur may be tallied 115. This third tally may be stored 117, "Tally $n_{suffixes}$."

From these three Tallies, a composite data record may be formed 119, which may be expressed as the data string:

(prefix@SECONDARY ID * Tally $n_{suffixes}$ Tally $n_{ss}$).

In other words, each unique (prefix, SECONDARY ID) pair, e.g., (name prefix 1, zip code), may be coupled with a tally indicative of the number of different suffixes found and the number of places found for that pair, e.g., (Macy's@98045*21 2005) indicating that there are "21" suffixes coupled with the "Macy's" at zip code "98045," and the prefix "Macy's" appears at "2005" unique zip codes.

At this juncture of the process, it has been found that it may be valuable to provide an optional visualization tool 121, e.g., a computer display or a hard copy print of the formed composite data strings in a format representative of the process results so far. FIG. 3 illustrates one such exemplary tool, a graph 301 showing a smattering of the data points 303 representative of each derived unique composite data string. The X-axis is the increasing number of SECONDARY IDs—e.g., locations—for each given prefix, Tally n. The Y-axis is the increasing number of unique PRIMARY ID's suffixes for each given SECONDARY ID, Tally $n_{suffixes}$. Such a tool may be valuable for practitioners in the field of data processing and data mining and knowledge discovery as an aid to insights as to data storage, data de-duplication and heuristics related thereto. Further description of FIG. 3 will be made with respect to a more specific embodiment illustrated in FIG. 2.

Returning to FIG. 1, from the composite data strings formed, masks—rules for ignoring dirty data portions of a data field, that in effect cleans up the contaminated data by removing variable data segments of the data field—are generated 123. Generally, the most likely valid case for a mask will be a composite data string having a relatively high count for Tally $n_{suffixes}$ or have a relatively high ratio of Tally $n_{suffixes}$/Tally $n_{ss}$.

The exact thresholds for determining which case is most appropriate depends on the input data set 101. Regression techniques or machine learning classifiers as would be known to persons skilled in the art may be employed for this determination. Some specific examples will be described with respect to FIG. 2 hereinbelow.

Returning to FIG. 1, once valid masks have been determined, they may be applied 125 to the input data set 101, automatically de-duplicating the m-records. The de-duplication version of the m-records 101 may be then compiled 127 into the central database. The process may be repeated for each periodically received data log or on a given time schedule, depending on the implementation.

It can be recognized at this juncture that the above-described process can be implemented as a software or firmware program. Moreover, it can be recognized that a method of doing business wherein a client—e.g., a credit card, issuer, a bank, or like client—may be charged for so processing data logs on a regular basis and for providing or maintaining, or both, a clean database may be instituted based upon the above-described process.

Figure 2:
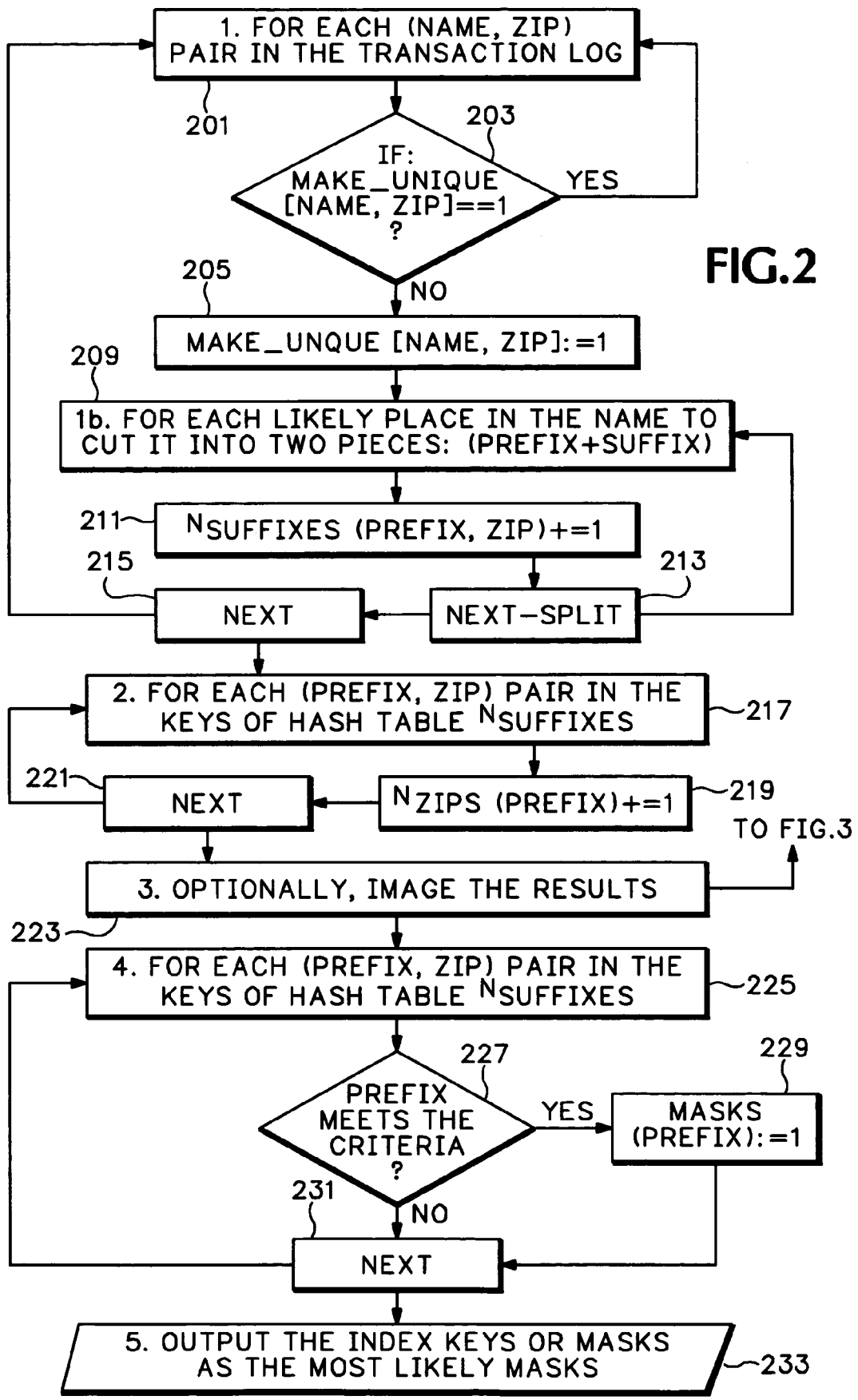
FIG. 2 is a flow chart illustrating a specific implementation of the embodiment as shown in FIG. 1.
Figure 3:
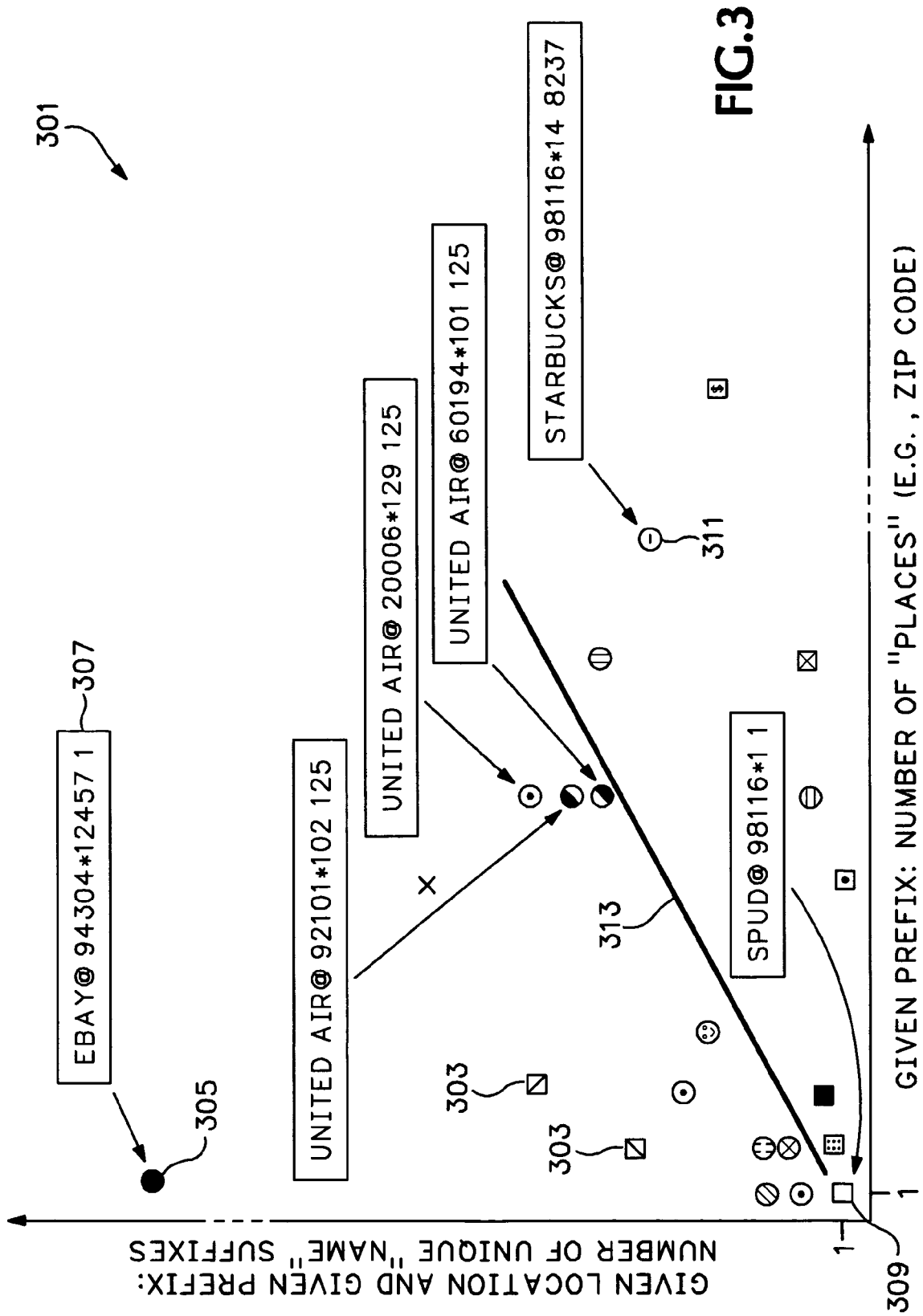
FIG. 3 is an exemplary embodiment of a display format for the implementation as shown in FIG. 2.

FIG. 2 is a flow chart illustrating a specific implementation of the embodiment as shown in FIG. 1. This exemplary implementation continues the foregoing example of credit card transaction logging and database cleaning where millions of transactions are logged daily.

Let a "(name, place)," where "name" may be considered potentially dirty data name and "place" is a five-digit zip code, be a selected data pair of retrievable entity identification digital data fields for each transaction data string in a raw data transaction log (see also, PRIMARY ID, SECONDARY ID described above with respect to FIG. 1). For example, let the raw data transaction log be a set of a million credit card transactions worldwide for Discover™ cards for a given day. For each recognizable (name, place) data pair in the log, 201, a first determination 203 may be made as to whether more than one received transaction record can be considered a unique data pair. For example, if the current transaction is for a restaurant "SPUD" at zip code "98116" and if this combination has been previously processed, 203, YES-path, the process 201, 203 loops back, 203, YES-path, to attempt to consolidate other raw data transaction records.

However, for example, if "WALMART #14" and "94304" appears in 1000 transactions of the current transaction data log, those records can be pre-consolidated to (WALMART #14, 94304) so that a possible mask can be generated from one consideration of an authorized merchant, here named "WALMART #14" at zip code "94304." In effect, the process may be streamlined by creating 201, 203, 205 a reduced data sub-set of the raw transaction data of unique (name, zip) pair data merchants to be considered for mask generation (see also, FIG. 1, "REMAINING RECORD pair").

Each so determined unique pair defined merchant 105 may be selected sequentially then to be the current pair under consideration 107 and processed to determine if and what masks can be generated. It should be kept in mind that the full "name" may be dirty data. As shown above, multiple stores with different store numbers, or street address, or the like other identifier, may have the same zip code; e.g., there are many Starbucks Coffee cafes in West Seattle, Wash. 98116. The "name" is a convenient data field to split since it is often corrupted. Therefore, assume for this embodiment that masks may be generated to merge common name prefixes.

For each name data given as a field of a transaction data record, a set of likely prefixes and suffixes of the full name data is generated 209. Consider (MACY**, 10023). For example, for the full given dirty data name "MACY'S WOMAN'S CLOTHING," prefix/suffix split point may be after "MACY," "MACY'S," "MACY'S WO," "MACY'S WOMAN'S" and the like. In other words, grammatical heuristic rules such as splitting data strings at any transition from letters to non-letters, two or more consecutive non-alphanumeric characters (e.g., spaces, symbols), or the like, may be employed.

A tally 211 of suffixes, "Nsuffixes," may be maintained 211, the subprocess looping 213, 209, 211, until the tally is completed for the current data pair (MACY**, 10023) under consideration. Continuing the same example, applying given heuristics, the store name field may be found to have seven different possible places to split it into a prefix and suffix. The tally for each prefix is incremented 211.

The process loops to select 215 the next unique (name, zip) data pair's full name data 107. The splitting and suffix tallying 209, 211, 213 may be repeated for each unique (name, zip) pair.

Once all "Nsuffixes" tallies have been stored, for each (prefix, zip) data pair, the hash table may be used to determine the number of zip codes, "Nzips," for each prefix, 217. For example, for the prefix MACY'S, there may be 2000 different zip codes. The "Nzips" may be tallied 219 for each prefix 221, 217, 219.

A digital tree may be used to efficiently store many overlapping prefixes. At each node, counts for "nplaces" and "nDistinctPlaces" plus a pointer to the hash table for "nSuffixes," are indexed by place. In an experimental implementation by the inventors, the tally variables were formed as hash table variables in the PERL programming language, the array being indexed by a string instead of an integer. If a string was not already listed in the table, the default value was blank, a value of zero with respect to a "+=" operator. Comma operators were used to concatenate two strings with a unique symbol between them, such as a control character "\001." This allowed a method for indexing a hash table as a two-dimensional or three-dimensional structure.

In a preferred embodiment, a visualization tool may be generated 223; the exemplary graph 301 shown in FIG. 3 is one such construct. Looking at a graphical data point 305, the interpretation 307 of this data point is that the prefix "EBAY" with zip code "94304" has been found to have Nsuffixes =12457 and Nzip =1. Looking at another data point 309, the prefix "SPUD" with zip code "98116" has been found to have only one suffix and only one zip code; in other words, in step 203, the (name, zip) appears only once in the transaction log 201. Again, one would expect a large number of such unique, single merchant data points clustered near the origin point 1,1 of the graph 301. Looking at yet another data point 311, the prefix "STARBUCKS" with zip code "98116" appears with fourteen suffixes, but also with 8237 zip codes. As mentioned hereinabove, such a tool may be valuable to a practitioner developing heuristics for developing mask generating rules in that a region of the graph with such interpretations which such as above and to the left of a decision boundary, dividing line 313 of the graph 301, may be suggestive of appropriate heuristics for having masks while a region to the right and below line 313 may be suggestive of prefixes which are not valid masks. The example of data point 309 obviously speaks to having no need of a mask; a unique data pair in a transaction log has no data duplication possibility. A data point such as point 311 is suggestive of a chain of franchises because of the very large number of places for a given prefix "STARBUCKS" in that Nzip ="8237." As each franchise may be a unique merchant, using just "STARBUCKS" as a mask is not appropriate as it is likely the fourteen suffixes in zip code 98116 indicate specific store identifications. There is the possibility of have fourteen dirty data combinations for a given prefix when a chain store has multiple locations in a single zip code. The example of data point 305 illustrates a clear result where "EBAY" is an appropriate prefix mask in that while there are "12457" suffixes, there is only one zip code; in other words, the suffixes are irrelevant to assigning the transactions of the log to a single file since there is only one "EBAY" merchant in the country. Data points close to the dividing line may suggest uncertainty and warrant further evaluation. From these examples it can be seen that implementation-specific heuristics may be employed for setting criteria to generate appropriate data-de-duplication masks.

Returning to FIG. 2, in general, for each (prefix, zip) pair 225 in the keys of the hash table Nsuffixes, mask testing criteria are applied 227. As one specific example, if a tally Nsuffixes for a given pair (prefix, zip) is greater than ten and a tally Nzips for that prefix is less than three hundred, one may generate 229 a mask using that prefix. For example, if a name field has a prefix "United Airlines #" with any other data in the name field string, one may assign the transaction to United Airlines Company corporate accounting file; expressed as a UNIX sed or PERL expression such as: "s/United Airlines #.*/United Airlines/." Data points 303, FIG. 3, are representative of prefixes a number of suffixes and a low number of zip codes; it is likely that therefore the related prefixes are good masks. Some generalized heuristics for analyzing credit card transactions in a received data log are:

(1) if a prefix of the name field is present in only one or a few places less than a given threshold number (e.g., nPlaces<10), yet has many distinct suffixes (e.g., nSuffixes >1000), let the prefix be an appropriate mask for all transactions (viz., the merchant is likely a single entity appending transaction numbers or the like);

(2) if a prefix of the name field has only a single or a few distinct suffixes less than a given threshold number (e.g., nSuffixes<10) and a relatively high tally for zip codes (e.g., nPlaces>1000), and a high tally for distinct places (e.g., nDistinctPlaces—many times in one zip code), do not generate a mask for that prefix (viz., likely a chain of distinct franchises with unique store numbers);

(3) if a prefix of the name field has a tally indicative of many distinct suffixes (e.g., nSuffixes>1000) and has a high tally indicative of many distinct places (e.g., nPlaces>500) but also the tally for places presents only a single suffix is zero, let that prefix be a valid mask for all transactions (viz., the merchant exists in many places and likely is using a transaction number, e.g., an airline company).

It will be recognized by those skilled in the art that data patterns appear only if given enough data to analyze. For example for a given prefix, "MACY'S," the store exists in many places and each may have "WOMAN'S CLOTH" as a suffix. It can be seen that the heuristics may be dependent to some extent on the nature of the database and input data logs.

The process loops 231, 225, 227 for each (prefix, zip) pair. Once all such data pairs have been considered, a set of masks, or data processing index keys to the masks, may be generated 233 as most likely valid masks.

Looking again to FIG. 1, the derived masks 123 can be applied to the current log 125 and those records then compiled 127 into the database. What can be also recognized is that the masks generally apply to the next activity log. Periodically—namely as appropriate to the type of database and input data for the specific implementation—the process may be applied to any new input log to add new masks. For example, once the Discover Card Company decides that the number of merchant increases by ten percent per month, a monthly application to generate new masks may be appropriate.

It will also be recognized by those skilled in the art the thresholds employed in a specific implementation also can be subject to machine learning with a training set of data; e.g., {if store>4000 zips, assume chain}; or {if >100 suffixes, <4000 zips=good mask}, or the like.

The described embodiments hereinabove focus on de-duplicating "merchant files" in a database by looking for merchants with a relatively high frequency of transactions at one of the potential locations combined with a relatively low number of zip codes. For example, if a mask boundary threshold is useful for a given merchant at a given zip code with more than 1000 transactions that has less than ten occurrences of their zip, one may choose merchants that have the ratio of number of transactions to number of zip codes greater than 10000/10=100. This focuses the analysis on more coverage of transactions. For example, if a merchant with 200 transactions has two zip codes, they also meet the same said boundary threshold criteria. Thus, it will be recognized that implementations can be tailored to different criteria depending upon the type of data records to be logged with de-duplication optimization.

Optionally, one may combine the foregoing analysis for generating masks with one or more other indicators of the importance of the accuracy of the selected indicator.

In other words, override rules for ignoring certain potential masks may be introduced based on other considerations such as the number of different transactions associated with the potential merchant name, the dollar amount of transactions, or the like. For example, all records having a transaction amount greater than $10,000.00 may be isolated, e.g., assigned to a special file, for further analysis.

Also optionally, the information removed from the dirty data name field by a derived mask may be put into different retrievable matrix arrays to prevent information loss. For example, a merchant identification number extracted as a suffix in a dirty data name field may be stored next to the merchant name field in a table having a pointer from the related mask-prefix, a transaction identification number extracted from a dirty data name field may be put into a new transaction identification number column in a transaction table having a pointer from the related mask-prefix, and the like.

The foregoing Detailed Description of exemplary and preferred embodiments is presented for purposes of illustration and disclosure in accordance with the requirements of the law. It is not intended to be exhaustive nor to limit the invention to the precise form(s) described, but only to enable others skilled in the art to understand how the invention may be suited for a particular use or implementation. The possibility of modifications and variations will be apparent to practitioners skilled in the art. No limitation is intended by the description of exemplary embodiments which may have included tolerances, feature dimensions, specific operating conditions, engineering specifications, or the like, and which may vary between implementations or with changes to the state of the art, and no limitation should be implied therefrom. Applicant has made this disclosure with respect to the current state of the art, but also contemplates advancements and that adaptations in the future may take into consideration of those advancements, namely in accordance with the then current state of the art. It is intended that the scope of the invention be defined by the Claims as written and equivalents as applicable. Reference to a claim element in the singular is not intended to mean "one and only one" unless explicitly so stated. Moreover, no element, component, nor method or process step in this disclosure is intended to be dedicated to the public regardless of whether the element, component, or step is explicitly recited in the Claims. No claim element herein is to be construed under the provisions of 35 U.S.C. Sec. 112, sixth paragraph, unless the element is expressly recited using the phrase "means for . . . " and no method or process step herein is to be construed under those provisions unless the step, or steps, are expressly recited using the phrase "comprising the step(s) of . . . "

What is claimed is:

1. A processor-implemented method for generating masks for data de-duplication from entity eponym data fields in a given set of data records, said data records each including an entity location data field, the method comprising:

for each data record, splitting each entity eponym data field into a corresponding prefix-suffix combination, and for each prefix, a processor computing a tally of distinct entity locations, and for each prefix and entity location combination, the processor computing a tally of distinct suffixes; and setting, by the processor, a threshold boundary wherein a prefix is defined as one of said masks when one or more of the tallies are indicative of different eponyms signifying a particular entity, wherein the one mask enables a particular data record to be matched to the particular entity by ignoring a portion of the particular data record, wherein said de-duplication involves matching each data record representing a specific activity to the particular entity of a plurality of known entities such that duplication of entities is reduced in a database of said plurality of known entities.

2. The method as set forth in claim 1, said setting the threshold boundary further comprising:

setting the threshold boundary wherein the prefix is defined as the one of said masks when one or more of the tallies indicate said entity eponym data fields include variable data.

3. The method as set forth in claim 1, said setting the threshold boundary further comprising:

setting the threshold boundary wherein the prefix is defined as the one of said masks when the tally of distinct suffixes is indicative of suffixes being information other than entity identity.

4. The method as set forth in claim 1, said setting the threshold boundary further comprising:

setting the threshold boundary where a ratio of the tally for said distinct suffixes to the tally for distinct entity locations is indicative of information other than entity identity.

5. The method as set forth in claim 1 further comprising:

applying an override function to ignore the one mask based on a characteristic of a data record.

6. The method as set forth in claim 1 further comprising:

prior to said splitting, creating a reduced data records sub-set by eliminating records having a unique entity eponym and entity location data pair.

7. The method as set forth in claim 1 further comprising:

generating a display showing a graph having points each representing a pair of a prefix and entity location as a function of a number of distinct suffixes and a number of distinct entity locations.

8. The method as set forth in claim 1 wherein said masks are generated as rules for ignoring variable data portions of the entity eponym data fields and assigning a respective data record therefor to said database based on a non-variable data portion of the corresponding entity eponym data field.

9. The method as set forth in claim 8 further comprising:

maintaining said database by periodic application of said rules to a different set of data records to be added to said database.

10. The method as set forth in claim 1, wherein the data records comprise business transaction records, and wherein the particular entity comprises a merchant.

11. The method as set forth in claim 1, further comprising applying the one mask made up of the prefix to a new set of data records to assign at least some of the new set of data records to the particular entity.

12. A processor-implemented method for partitioning a plurality of data packets in a database such that duplication of data groups is minimized, the method comprising:
   selecting a primary identifier data field and a secondary identifier data field for each data packet that represents a corresponding activity;
   for all data packets having a non-unique primary identifier data field, using heuristic procedures for splitting each primary identifier data into at least one prefix-suffix combination;
   for each prefix, counting a first tally of how many distinct secondary identifier data fields occurs, and counting a second tally of how many distinct secondary identifier data fields occur with a single suffix, and for each prefix and each secondary identifier data field matched thereto, counting a third tally of how many distinct suffixes occur;
   based on said first tally, said second tally and said third tally generating masks representative of prefixes applicable to said data packets having a non-unique primary identifier data field such that application of said masks assigns data packets having a non-unique primary identifier data field to associated common entities defined thereby, wherein application of said masks provides cleaning of the data packets; and
   filing each of said data packets into a single file assigned to respective said associated common entities defined.

13. The method as set forth in claim 12 wherein said primary identifier data field is an intended unique entity name data field.

14. The method as set forth in claim 12 wherein said masks are generated to merge common entity name prefixes.

15. The method as set forth in claim 12 wherein said secondary identifier data field is a postal code data field.

16. The method as set forth in claim 12 further comprising:
   retaining said masks as rules for cleaning dirty data portions of a data field of each data packet by removing variable data segments therefrom.

17. A processor-implemented method of data de-duplication comprising:
   receiving, by a processor, a periodic log of transactions representing corresponding activities associated with entities, each transaction represented by a data string including at least a name field and another identifier field;
   selecting, by the processor, unique representative samples of said transactions;
   for each of said samples, the processor dissecting each name field into a corresponding prefix and suffix combination, and for each prefix and each another identifier combination, the processor counting a number of distinct suffixes and storing a tally therefor; and
   generating, by the processor, a mask from a specific prefix when the specific prefix meets a predefined decision criteria which is a function of said tally, wherein the mask is applicable to the log of transactions to enable at least some of the data strings to be matched to a particular entity name by ignoring variable portions of the at least some data strings such that duplication of entities is reduced.

18. The method as set forth in claim 17 wherein for each said prefix, counting prefix-another identifier combinations and storing a first tally therefor and counting prefix-distinct another identifier combinations and storing a second tally therefor, such that said predefined decision criteria is a function of said tallies.

19. The method as set forth in claim 17, wherein the transactions comprise business transactions, and the entity name is a name of a merchant.

20. The method as set forth in claim 19, further comprising the processor applying the mask to the data strings to consolidate transactions associated with the merchant.

21. A computer memory containing instructions that when executed cause a computer to:
   store a given set of data records representing activities for a given set of entities, each of said data records having discrete data fields including an entity identification field and an entity location field;
   split each entity identification field into a corresponding prefix-suffix combination;
   for each prefix, compute a tally of distinct entity locations;
   for each prefix and entity location field combination, compute a tally of distinct suffixes therefor;
   set a threshold boundary wherein a prefix is defined as one of said masks when one or more of the tallies is indicative of different entity identification strings in entity identification fields signifying a single one of said entities; and
   apply said masks to said given set of data records such that each record is assigned to a corresponding one of said given entities, wherein applying the masks provides cleaning of the data records.

* * * * *

UNITED STATES PATENT AND TRADEMARK OFFICE
CERTIFICATE OF CORRECTION

PATENT NO. : 7,200,604 B2
APPLICATION NO. : 10/780235
DATED : April 3, 2007
INVENTOR(S) : George Henry Forman et al.

It is certified that error appears in the above-identified patent and that said Letters Patent is hereby corrected as shown below:

In column 4, line 38, after "log of" delete ""in"" and insert -- "m" --, therefor.

Signed and Sealed this

Fifth Day of May, 2009

JOHN DOLL
*Acting Director of the United States Patent and Trademark Office*